(12) United States Patent
Lee

(10) Patent No.: US 10,482,274 B2
(45) Date of Patent: Nov. 19, 2019

(54) TERMINAL DEVICE AND METHOD FOR PROTECTING TERMINAL DEVICE, AND TERMINAL MANAGEMENT SERVER

(71) Applicant: SK TELECOM CO., LTD., Seoul (KR)

(72) Inventor: Eungsuk Lee, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 324 days.

(21) Appl. No.: 15/005,763

(22) Filed: Jan. 25, 2016

(65) Prior Publication Data
US 2016/0142403 A1 May 19, 2016

Related U.S. Application Data

(63) Continuation of application No. PCT/KR2014/008046, filed on Aug. 28, 2014.

(30) Foreign Application Priority Data

Aug. 29, 2013 (KR) .................. 10-2013-0103335
Aug. 30, 2013 (KR) .................. 10-2013-0104293

(51) Int. Cl.
*G06F 21/62* (2013.01)
*G06F 15/16* (2006.01)
(Continued)

(52) U.S. Cl.
CPC ............ *G06F 21/6218* (2013.01); *G06F 9/44* (2013.01); *G06F 9/4416* (2013.01); *G06F 11/30* (2013.01);
(Continued)

(58) Field of Classification Search
CPC ........ G06F 21/6218; G06F 9/44; G06F 11/30; G06F 21/60; H04L 63/083
(Continued)

(56) References Cited

U.S. PATENT DOCUMENTS 7,725,558 B2 * 5/2010 Dickenson ............. G06F 21/78
709/215
8,429,759 B2 * 4/2013 Adrangi ................ H04W 12/12
340/500
(Continued)

FOREIGN PATENT DOCUMENTS

CN 101933349 A 12/2010
JP 2012199751 A 10/2012
(Continued)

OTHER PUBLICATIONS

Handa, "Knives: Network based Demand and Supply Control System—Enhancement for Network and Environmental Affinity", 2007, IEEE, pp. 1171-1176 (Year: 2007).*
(Continued)

*Primary Examiner* — David J Pearson
*Assistant Examiner* — Gregory A Lane
(74) *Attorney, Agent, or Firm* — Hauptman Ham, LLP

(57) ABSTRACT

A terminal device includes: a condition checking unit to monitor an operation state of the terminal device by executing a terminal managing program, and determine whether the terminal device is in a state of a preset condition for terminal protection; a communication control unit to control the communication unit to be connected to the terminal management server using the location information when the condition checking unit determines that the terminal device is in a state of the condition for terminal protection, and control the communication unit to send the identification information to the terminal management server; and a lock control unit configured to lock the terminal device by executing the terminal managing program when a lock command is issued by, and received from, the terminal management server.

12 Claims, 5 Drawing Sheets

(51) Int. Cl.
*G06F 9/44* (2018.01)
*G06F 11/30* (2006.01)
*G06F 21/60* (2013.01)
*G06F 9/4401* (2018.01)
*H04L 29/06* (2006.01)
*H04W 12/08* (2009.01)

(52) U.S. Cl.
CPC .............. *G06F 15/16* (2013.01); *G06F 21/60* (2013.01); *G06F 21/604* (2013.01); *H04L 63/083* (2013.01); *H04L 63/0853* (2013.01); *H04W 12/08* (2013.01)

(58) Field of Classification Search
USPC ....................................................... 726/7, 34
See application file for complete search history.

(56) References Cited

U.S. PATENT DOCUMENTS

| | | | |
|---|---|---|---|
| 2005/0055397 A1 | 3/2005 | Zhu et al. | |
| 2005/0170813 A1 | 8/2005 | Choi | |
| 2006/0190724 A1 | 8/2006 | Adams et al. | |
| 2008/0070590 A1* | 3/2008 | Miyajima | H04W 8/245 455/456.3 |
| 2010/0325712 A1* | 12/2010 | Kakuta | G06F 21/6218 726/7 |
| 2011/0125875 A1* | 5/2011 | Matsui | H04L 63/0272 709/219 |
| 2012/0258689 A1* | 10/2012 | Yang | H04M 1/57 455/411 |
| 2014/0026188 A1 | 1/2014 | Gubler | |
| 2014/0150049 A1* | 5/2014 | Kwon | H04L 63/1416 726/1 |
| 2014/0237190 A1 | 8/2014 | Park | |
| 2015/0026826 A1* | 1/2015 | Allegri | H04L 63/10 726/29 |

FOREIGN PATENT DOCUMENTS

| | | |
|---|---|---|
| KR | 1020050025913 A | 3/2005 |
| KR | 1020050079128 A | 8/2005 |
| KR | 1020060028275 A | 3/2006 |
| KR | 1020100024300 A | 3/2010 |
| KR | 1020100113385 A | 10/2010 |
| KR | 1020130024212 A | 3/2013 |
| WO | 2009075807 A1 | 6/2009 |

OTHER PUBLICATIONS

International Search Report dated Dec. 30, 2014 for PCT/KR2014/008046, citing the above reference(s).

U.S. Office Action dated Sep. 29, 2017 issued in corresponding U.S. Appl. No. 15/005,818.

Chinese Office Action dated Sep. 4, 2018, in connection with the Chinese Patent Application No. 201480047779.0 citing the above reference(s).

* cited by examiner

TERMINAL DEVICE AND METHOD FOR PROTECTING TERMINAL DEVICE, AND TERMINAL MANAGEMENT SERVER

CROSS-REFERENCE TO RELATED APPLICATIONS

The present application is a continuation of International Patent Application No. PCT/KR2014/008046, filed Aug. 28, 2014, which claims the priorities to and benefit of Korean Patent Application No. 10-2013-0103335, filed on Aug. 29, 2013 and Korean Patent Application No. 10-2013-0104293, filed on Aug. 30, 2013. The disclosures of the above-listed applications are hereby incorporated by reference herein in their entirety.

TECHNICAL FIELD

The present disclosure relates to a terminal device, a method for protecting the terminal device and a terminal management server.

BACKGROUND

The statements in this section merely provide background information related to the present disclosure and may not constitute prior art.

The inventor(s) has experienced that since users store important personal information (i.e., such as private information, financial information, security information and so on) on their terminal devices, for example, smart phones or tablet computers, the personal information is subject to secure from a private information exposure and be protected from identity theft.

The inventor(s) has noted that according to an exemplary method for protecting the personal information based on the OMA (Open Mobile Alliance) DM (Device Management) Standard, a terminal managing program is installed in a terminal device to perform a Lock & Wipe function for protecting information stored in the terminal device.

When a terminal management server sends to the terminal device through a message server a message for commanding access to the server, the terminal managing program installed in the terminal device allows the terminal device to access the terminal management server through a mobile communication network in response to the message for commanding access to the terminal management server.

The terminal management server then sends a control command to the terminal device through the mobile communication network, and the terminal managing program locks the screen and functions of the terminal device, and wipes out (deletes) all information stored in the terminal device if required.

However, the inventor(s) has experienced that when the terminal device is lost and an obtainer of the terminal device maliciously manipulates the terminal device to prevent the terminal managing program from performing the Lock & Wipe function, the personal information stored in the terminal device is still subject to be protected.

SUMMARY

In accordance with an embodiment of the above mentioned present disclosure, a terminal device includes: a communication unit, a memory unit, a condition checking unit, a communication control unit and a lock control unit. The communication unit is configured to communicate with a terminal management server. The memory unit is configured to store unique identification information, location information to access the terminal management server, and a terminal managing program for locking the terminal device. The condition checking unit is configured to monitor an operation state of the terminal device by executing the terminal managing program and determine whether the terminal device is in a state of a preset condition for terminal protection. The communication control unit is configured to control the communication unit to be connected to the terminal management server using the location information when the condition checking unit determines that the terminal device is in a state of a preset condition for terminal protection, and control the communication unit to send the identification information to the terminal management server. The lock control unit is configured to lock the terminal device by executing the terminal managing program when a lock command is issued by, and received from, the terminal management server.

In accordance with an embodiment of the above mentioned present disclosure, a method of protecting a terminal device comprising one or more processors and/or application-specific integrated circuits (ASICs), the method executed by the one or more processors and/or the ASICs, the method includes: monitoring an operation state of the terminal device to determine whether the terminal device is in a state of a preset condition for terminal protection. The method also includes accessing a terminal management server using preset location information when the terminal device is in a state of the preset condition for terminal protection. The method also includes sending identification information of the terminal device to the accessed terminal management server. The method also includes locking the terminal device when a lock command is issued by, and received from, the terminal management server.

In accordance with an embodiment of the above mentioned present disclosure, a terminal management server includes: a communication unit, an information storage unit, a terminal identification unit, a communication environment checking unit, and a lock commanding unit. The communication unit is configured to support a plurality of communication channels for communication with a terminal device. The information storage unit is configured to store first unique information of the terminal device which is requested to be protected. The terminal identification unit is configured to compare second identification information of the terminal device received through the communication unit with the first unique information, identify whether the terminal device is requested to be protected based on a result of the comparison, and determine that the terminal device is requested to be protected when the first unique information is equal to the second unique information. The communication environment checking unit is configured to check current communication environment situation of the protected terminal device. The lock commanding unit sends a terminal lock command to the terminal device to be protected through a communication channel corresponding to the current communication environment situation among the plurality of communication channels.

DETAILED DESCRIPTION OF THE EMBODIMENTS

Figure 1:
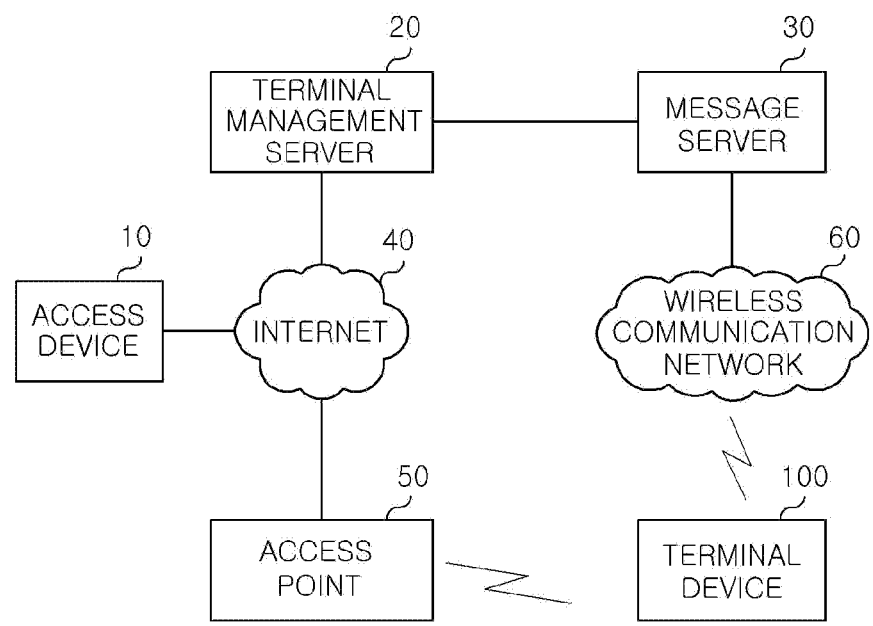
FIG. 1 is a block diagram of a communication service network system including a terminal device loaded with a terminal managing program for performing a method for protecting the terminal device in accordance with at least one embodiment of the present disclosure.

Hereinafter, aspects of the present disclosure will be described in detail with reference to the accompanying drawings. In the following description, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

Additionally, in describing the components of the present disclosure, there are terms used like first, second, A, B, (a), and (b). These are solely for the purpose of differentiating one component from the other but not to imply or suggest the substances, order or sequence of the components. If a component were described as 'connected', 'coupled', or 'linked' to another component, they mean the components are not only directly 'connected', 'coupled', or 'linked' but also are indirectly 'connected', 'coupled', or 'linked' via a third component. The terms, such as "first" and "second," are used to describe various elements. The terms are merely used to distinguish one element from other elements, but are not used to limit the elements. Throughout the drawings, like numerals refer to portions that perform similar functions and exert similar effects, and duplicate descriptions of the portions will be omitted.

Herein, the term of "lock & wipe" function indicates the data (e.g., personal information such as private information, financial information, security information and so on) stored in the terminal device are kept safely by remotely locking the terminal device through a customized message and a secure passcode and wiping (i.e., deleting) the personal data (i.e., personal information) stored in the terminal device.

The advantages and features of exemplary embodiments of the present disclosure and methods of accomplishing them will be clearly understood from the following description of the embodiments taken in conjunction with the accompanying drawings. However, the present disclosure is not limited to those embodiments and is implemented in various forms. It should be noted that the embodiments are provided to make a full disclosure and also to allow those skilled in the art to know the full scope of the present disclosure.

In the following description, well-known functions and/or configurations will not be described in detail if they would unnecessarily obscure the features of the disclosure. Further, the terms to be described below are defined in consideration of their functions in the embodiments of the disclosure and vary depending on a user's or operator's intention or practice. Accordingly, the definition is made on a basis of the content throughout the present disclosure.

FIG. 1 is a block diagram of a communication service network system including a terminal device loaded with a terminal managing program for performing a method for protecting the terminal device in accordance with an embodiment of the present disclosure.

As shown in FIG. 1, the communication service network system includes an access device 10, a terminal management server 20, a message server 30, the Internet 40, an access point 50, a mobile communication network 60, and a terminal device 100 in which a terminal managing program for performing a method for protecting the terminal device in accordance with an embodiment of the present disclosure is installed. Each of the access device 10, the terminal management server 20, the message server 30, the access point 50, and the terminal device 100 is implemented by, or includes, one or more processors and/or application-specific integrated circuits (ASICs) specified for respectively corresponding operations and functions described herein in the present disclosure. Each of the access device 10, the terminal management server 20, the message server 30, the access point 50, and the terminal device 100 includes a communication module (or a communication modem) to transmit and receive communication signals through the internet 40 and/or the wireless communication network 60. Herein, the wireless communication network 60 includes wireless networks for example, one or more network interfaces including, but not limited to, cellular, Wi-Fi, LAN, WAN, CDMA, WCDMA, GSM, LTE and EPC networks, and cloud computing networks.

The access device 10 is a communication terminal for accessing the terminal management server 20 through the Internet 40 to request terminal protection.

The access device 10 is implemented as a mobile communication terminal device such as a smart phone, notepad or tablet computer, or a wired communication terminal device such as a PC (Personal Computer) to access the Internet 40 through a wired network.

The terminal management server 20 requests the message server 30 to order (or command) the terminal device 100 to access the terminal management server 20 when protection of the terminal device 100 is requested by the access device 10, and sends result of the request to the access device 10. Further, when the terminal device 100 sends to the terminal management server 20 terminal identifying information after being connected through the Internet 40 or the mobile communication network 60, the terminal management server 20 sends a lock command, and its result to the access device 10 when it is a terminal device requested to be protected. The terminal management server 20 is described further below with reference to FIG. 3.

The message server 30 sends a message for commanding access to the terminal management server 20 to the terminal device 100 when the terminal management server 20 requests the message server 30 to order (or command) the terminal device to access the terminal management server 20, and its result to the terminal management server 20.

The access point 50 provides a wireless communication channel to enable the terminal device 100 to make a wireless connection to the Internet 40. For example, the access point 50 provides a wireless communication channel to access a short-range mobile communication network connected to the Internet by using wireless transmission technology, for example, Wi-Fi or Bluetooth.

The mobile communication network 60 is implemented by one or a combination of various mobile communication systems such as the LTE (Long Term Evolution) communication system which uses the EPC (Evolved Packet Core)

network, the WCDMA (Wideband Code Division Multiple Access) communication system, the GSM (Global System for Mobile) communication system, the CDMA (Code Division Multiple Access) communication system, and the TDMA (Time Division Multiple Access) communication system, but not limited thereto.

The terminal device 100 is implemented as a wireless communication terminal device, for example, a smart phone, notepad, or tablet computer, or may be a wired communication terminal device provided with communication service through a wired network. A terminal managing program for performing a method for protecting the terminal device 100 in accordance with at least one embodiment of the present disclosure is installed in the aforementioned terminal device 100.

By means of the terminal managing program stored in advance in a non-volatile data storage area which would not be reset by initialization, the terminal device 100 monitors the operation state thereof, actively accesses the terminal management server 20 to receive a control command by using predetermined location information when the operation state of the terminal device 100 satisfies a preset condition for terminal protection, and performs a locking function for a terminal device when the control command is to lock the terminal device 100. For example, the terminal device 100 displays a locking mode of a terminal device on a screen and restricts sending and/or receiving data and calls, and all established functions, except emergency calls.

Figure 2:
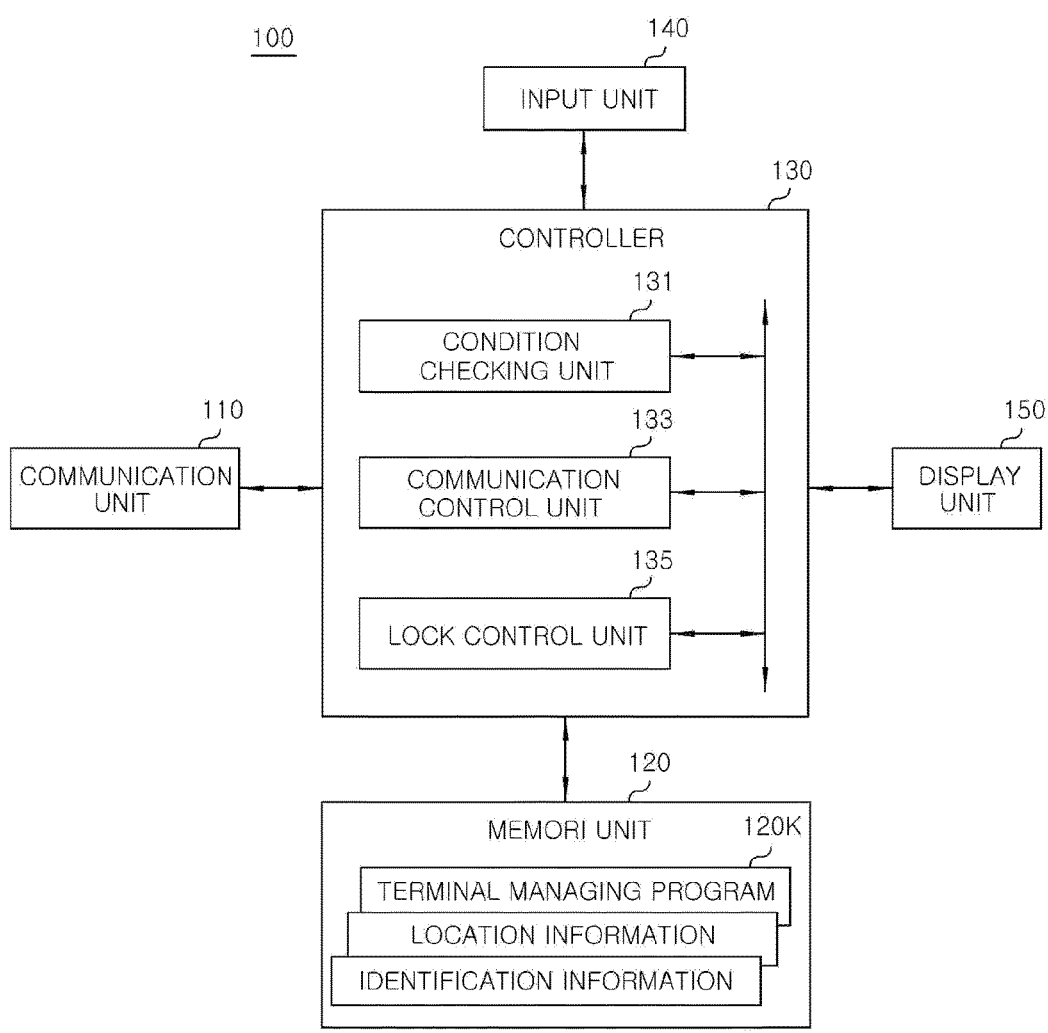
FIG. 2 is a detailed block diagram of the terminal device shown in FIG. 1.

FIG. 2 is a detailed block diagram of the terminal device shown in FIG. 1. As shown in FIG. 2, the terminal device 100 includes a communication unit 110, a memory unit 120, a controller 130, an input unit 140, and a display unit 150. The controller 130 includes a condition checking unit 131, a communication control unit 133 and a lock control unit 135. Each of the communication unit 110, the controller 130, and the display unit 150 is implemented by, or includes, one or more processors and/or application-specific integrated circuits (ASICs) specified for respectively corresponding operations and functions described herein in the present disclosure. The communication unit 110 includes a communication module to transmit and receive communication signals through the wireless communication network 60. The memory unit 120 includes non-transitory computer readable recording medium to store terminal managing programs, location information and identification information. The input unit 140 includes for example, a touch screen, a keypad, a voice receiver, buttons and so on. Each component of the controller 130, such as the condition checking unit 131, the communication control unit 133 and the lock control unit 135 is implemented by, or includes, one or more processors and/or application-specific integrated circuits (ASICs) specified for respectively corresponding operations and functions described herein in the present disclosure The communication unit 110 sends and/or receives signals (i.e., communication signals including data signals and/or control signals) for wireless communication or wired communication of the terminal device 100. The signals include packet data for communication functions of the terminal device 100, unique identification information for locking the terminal device 100 and lock commands. To this end, the communication unit 110 includes a transmitter for upconverting and amplifying the frequencies of signals to be transmitted and a receiver for low-noise-amplifying received signals and down-converting the frequencies of the received signals. The communication unit 110 accesses the terminal management server 20 through a communication channel on the basis of location information stored in advance in the memory unit 120. The communication unit 110 sends unique identification information stored in advance in the memory unit 120 through the communication channel, and receives a lock command issued by the terminal management server 20 to provide it to the controller 130.

The memory unit 120 includes a non-volatile data storage area which would not be reset even when the terminal device 100 is initialized, and an OS (Operating System) program, a terminal managing program 120K for locking the terminal device 100, unique identification information 120K, and location information 120K for access to the terminal management server 20 are stored in the non-volatile data storage area. In addition, the memory unit 120 further includes a volatile data storage area and a data storage area which is non-volatile but reset when the terminal device 100 is initialized.

For example, the system area stored with an OS program for booting, frameworks and essential applications is used to store terminal managing programs for locking the terminal device 100, unique identification information, and location information for access to the terminal management server 20. In other cases, the root file system/kernel in which information and data required for booting, for example, files for initializing the system and controlling peripheral devices are stored is used to store terminal managing programs for locking the terminal device 100, unique identification information, and location information for access to the terminal management server 20. In other cases, a boot loader is used to store terminal managing programs for locking the terminal device 100, unique identification information, and location information for access to the terminal management server 20. The boot loader stores a program for finishing all related tasks required for normally starting the kernel and finally starting the OS program, while being executed in advance before start-up of the OS program when booting the terminal device 100.

The controller 130 includes a condition checking unit 131 operating in accordance with terminal managing programs executed in response to booting by execution of the OS program stored in the memory unit 120, a communication control unit 133, and a lock control unit 135. The controller 130 is implemented with a CPU (Central Processing Unit), an AP (Application Processor), or the like.

The condition checking unit 131 of the controller 130 monitors the operation state of the terminal device 100 in accordance with execution of the terminal managing program to determine whether a preset condition for terminal protection is satisfied. In this case, the condition checking unit 131 determines whether preset manipulation occurs while the terminal device 100 is operated to check whether the condition for terminal protection is satisfied. That is, the controller 130 monitors whether the terminal device 100 is in a state of, or on condition for, a terminal protection mode (i.e., preset condition for terminal protection) to thereby execute the terminal protection for the terminal device 100. Herein, the preset condition for terminal protection includes such a state as, for example, SIM (Subscriber Identity Module) separation away from the terminal device 100, SIM replacement which is occurred in the terminal device 100, or country code change or firmware update which is performed or occurred in the terminal device 100. The condition checking unit 131 determines that the terminal device 100 is in a state to execute the terminal protection when such exemplary present conditions to need the terminal protection are occurred.

The communication control unit 133 of the controller 130 controls the communication unit 110 to access the terminal management server 20 using the location information stored in the memory unit when the condition checking unit 131 determines that the condition for terminal protection is satisfied (i.e., determines that the terminal device 100 is in a state to execute the terminal protection to thereby secure personal information from a private information exposure and prevent the personal information from identity theft), and also controls the communication unit 110 to send unique identification information pre-stored in the memory unit 120 to the terminal management server 20. In this regard, the communication control unit 133 monitors the communication channel of the communication unit 110 when the condition checking unit 131 determines that the condition for terminal protection is satisfied, and control the communication unit 110 to access the terminal management server 20 through the connected communication channel.

The lock control unit 135 of the controller 130 locks the terminal device 100 by executing the terminal managing program stored in advance in the memory unit 120 when a lock command is issued by the terminal management server 20. For example, the lock control unit 135 locks a screen and functions of the terminal device 100 or wipes (delete) out the information stored in the terminal device 100.

The input unit 140 creates input signals by user's key operation for controlling the terminal device 100 and sends the input signals to the controller 130. The input unit 140 is implemented by a keypad or keyboard including mechanical-type buttons, or a unit, such as a touch screen, integrated with output means.

The display unit 150 is implemented as various visual output devices including a flat panel display, for example, an LCD (Liquid Crystal Display) and OLED (Organic Light Emitting Diode). The display unit 150 visually provides the menu of the terminal device 100, input data, functional setup information, and other information to a user of the terminal device 100. The display unit 150 presents a booting screen, a waiting screen, a menu screen, other application program screens, and operation screens of the terminal device 100. When the lock control unit 135 locks the terminal device 100, the display unit 150 displays a terminal locking screen and a message for restricting data and calls and all established functions except for emergency calls, on its screen. For example, the display 150 is implemented to be integrated with input means, for example, a touch screen.

Meanwhile, although not shown in FIG. 2, the memory unit 120 includes a SIM when the terminal device 100 is implemented as a mobile communication terminal device, for example, a smart phone. For example, the memory unit 120 includes a USIM card equipped in a mobile communication terminal device, for example, a smart phone.

In case where the specific functions of communication such as voice communication and data communication are not included in the terminal device 100 described above, the input unit 140 and the display unit 150 is removed from among the communication unit 110, the memory unit 120, the controller 130, the input unit 140, and the display unit 150. In addition, the control function of the communication control unit 133 included in the controller 130 is partially limited.

Figure 3:
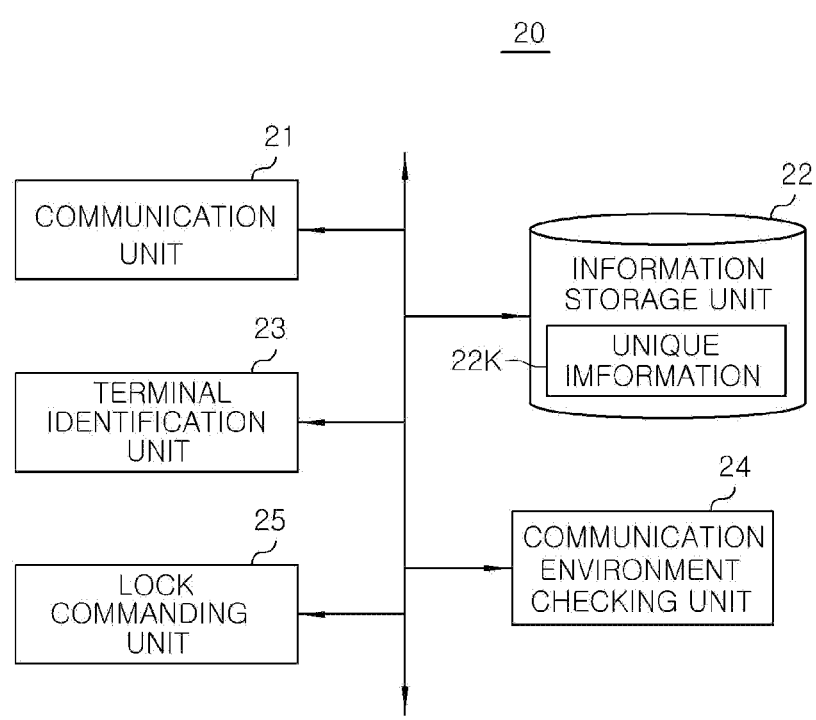
FIG. 3 is a detailed block diagram of the terminal management server shown in FIG. 1.

FIG. 3 is a detailed block diagram of the terminal management server shown in FIG. 1.

Referring to FIGS. 1 and 3, the terminal management server 20 includes a communication unit 21, an information storage unit 22, a terminal identification unit 23, a communication environment checking unit 24, and a lock commanding unit 25. Each component of the communication unit 21, the terminal identification unit 23, the communication environment checking unit 24, and the lock commanding unit 25 is implemented by, or includes, one or more processors and/or application-specific integrated circuits (ASICs) specified for respectively corresponding operations and functions described herein in the present disclosure. The information storage unit 22 includes non-transitory computer readable recording medium to store unique information (e.g., unique information 22K shown in FIG. 3).

The communication unit 21 supports a plurality of communication channels for communication with the terminal device 100. The communication unit 21 supports a communication channel for using the mobile communication network 60 and a communication channel for using the Internet 40.

The information storage unit 22 stores unique information 22K of a terminal device which is requested to be protected among a plurality of terminal devices 100.

The terminal identification unit 23 identifies whether the terminal device 100 is a terminal device to be protected based on the result of comparing the identification information of the terminal device 100 received through the communication unit 21 with the unique information stored in the information storage unit 22. The terminal identification unit 23 stores unique information of the terminal device 100 received through the communication unit 21 in the information storage unit 22 when the access device 10 provides the unique information, for example, identification information of the terminal device 100 and requests the terminal device 100 to be protected.

The communication environment checking unit 24 checks the current communication environment situation of the terminal device 100 to be protected. The communication environment checking unit 24 checks the current communication environment situation of the terminal device 100 to be protected depending on a communication channel through which the identification information of the terminal device 100 is received among a plurality of communication channels.

The lock commanding unit 25 uses the communication channel allowed in the current communication environment situation of the terminal device 100 to be protected among the plurality of communication channels supported by the communication unit 21 to send a terminal lock command to the terminal device 100 to be protected. The lock commanding unit 25 sends a terminal lock command via a communication channel which utilizes the mobile communication network 60 or a communication channel which utilizes the Internet 40.

Figure 4:
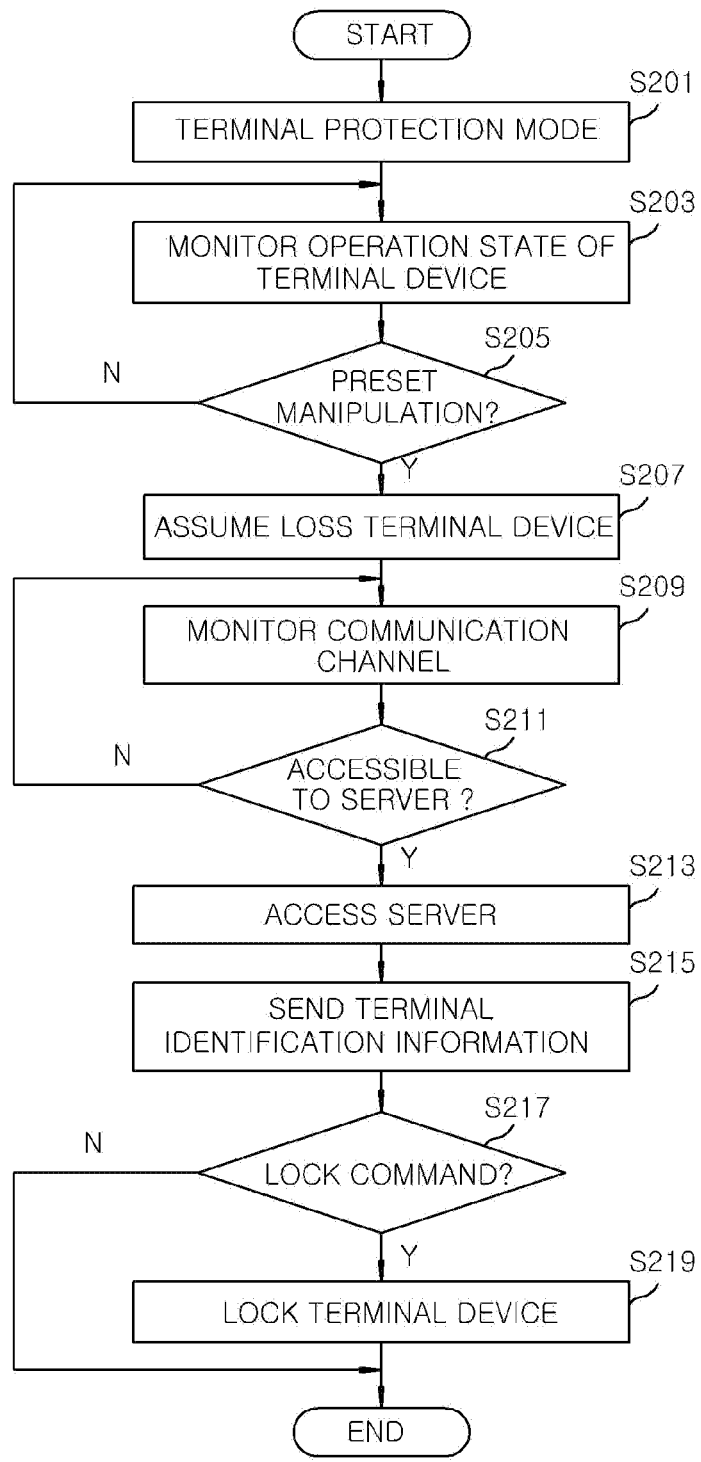
FIG. 4 is a flow diagram of a method for protecting a terminal device in accordance with at least one embodiment of the present disclosure.

FIG. 4 is a flow diagram of a method for protecting a terminal device in accordance with at least one embodiment of the present disclosure.

As shown in FIGS. 2 and 4, the controller 130 monitors whether the terminal device 100 is in a state of, or on condition for, a terminal protection mode (i.e., preset condition for terminal protection) to thereby execute the terminal protection for the terminal device 100. That is, the operation state of the terminal device 100 is monitored whether the terminal device is in a preset terminal protection mode (steps S201 and S203). The condition checking unit 131 determines that the terminal device 100 is in a state to execute the terminal protection when a present condition to need the terminal protection is occurred. Herein, the preset condition for terminal protection includes such a state as, for example, SIM (Subscriber Identity Module) separation away from the terminal device 100, SIM replacement which is occurred in the terminal device 100, or country code change or firmware update which is performed or occurred in the terminal device 100. That is an occurrence of a preset manipulation is checked by determining whether a terminal protection condition is satisfied (step S205). In this case, it is determined that the terminal protection condition is satisfied when a manipulation such as, for example, the SIM separation, the SIM replacement, the country code change or the firmware update, occurs in the terminal device 100.

Further, the method further includes steps S207 and S209 for assuming that the terminal device 100 is lost and monitoring a communication channel when the condition for terminal protection is satisfied; and steps S211 and S213 for accessing the terminal management server 20 through the communication channel by the use of preset location information when the communication channel is connected.

In addition, the method further includes step S215 for sending unique identification information of the terminal device 100 stored in advance to the accessed terminal management server 20, and steps S217 and S219 for locking the terminal device 100 when the terminal management server 20 issues a lock command.

Figure 5:
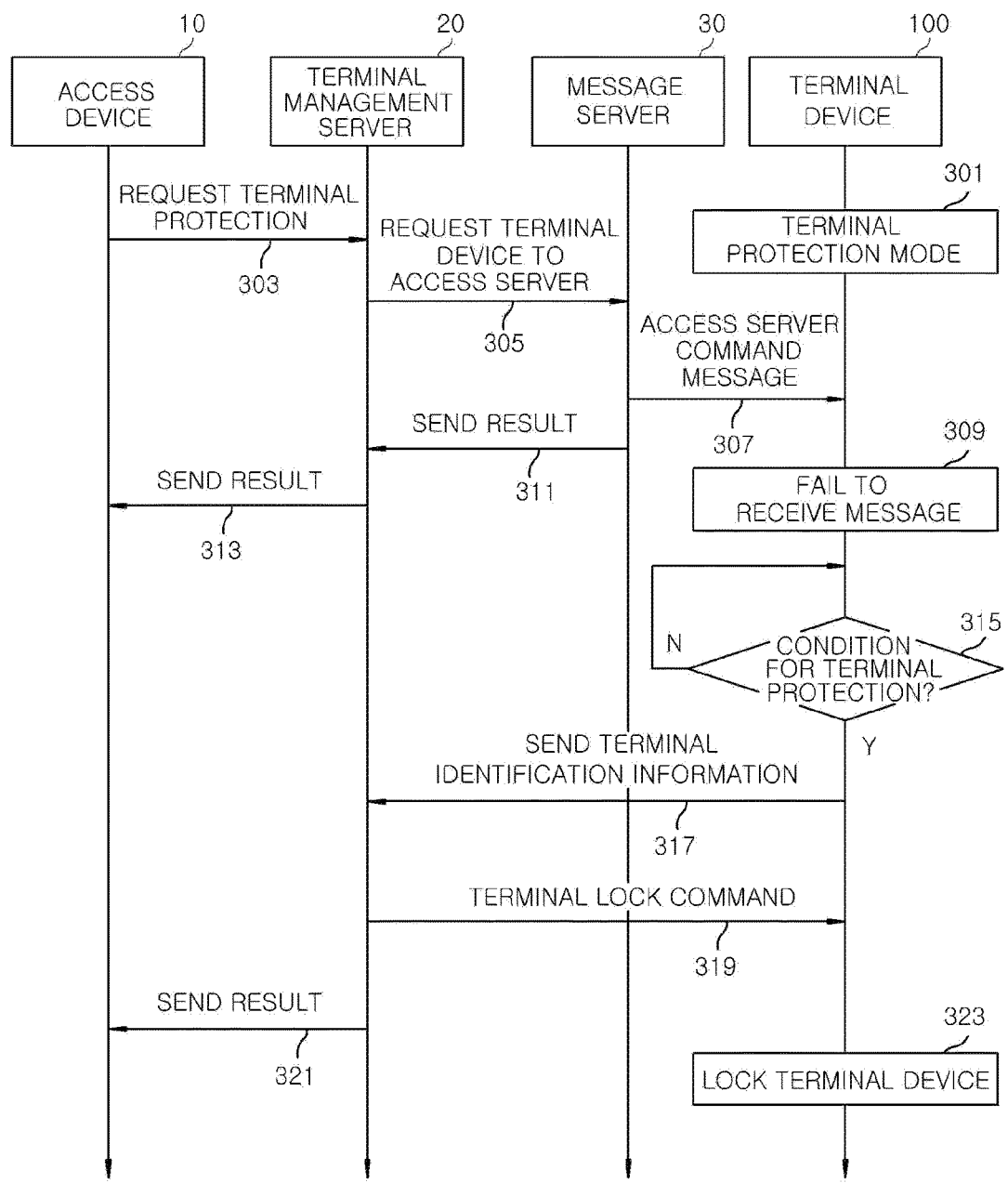
FIG. 5 is a signal flow diagram for terminal protection carried out between a terminal device to perform a method of protecting the terminal device and a terminal management server in accordance with at least one embodiment of the present disclosure.

FIG. 5 is a signal flow diagram for terminal protection carried out between the terminal device 100 loaded with the terminal managing program for protecting the terminal device 100, in accordance with at least one embodiment and the terminal management server 20.

Hereinafter, the process of protecting, e.g., personal information by locking the terminal device 100 loaded with the terminal managing program for terminal protection in accordance with at least one embodiment of the present disclosure will be described with reference to FIGS. 1 to 5 in more detail.

First, when a user wants to lock the terminal device 100 by means of the terminal protection mode at stage 301 by executing the terminal managing program for performing the method for terminal protection, which is loaded in advance into the terminal device 100, the access device 10 of the user accesses the terminal management server 20 through the Internet 40, and then provides unique information, for example, the identification information of the terminal device 100 to request the terminal device 100 to be protected at stage 303. For example, the user's access device 10 provides a subscriber number or the IMEI (International Mobile Equipment Identity) of the terminal device 100 as identification information. That is, the access device 10 of the user sends a request signal (or a message) to access the terminal management server 20 through the Internet 40, and then provide the unique information (e.g., the identification information of the terminal device 100 such as the subscriber number or the IMEI) with the terminal management server 20 to set the terminal device 100 in the protection mode.

Subsequently, the terminal identification unit 23 of the terminal management server 20 stores the unique information, for example, the identification information of the terminal device 100 received through the communication unit 21 in the information storage unit 22. The terminal identification unit 23 requests the message server 30 (i.e., send a request signal or message to the message server 30) to order (command or instruct) the terminal device 100 to access the terminal management server 20 at stage 305, and the message server 30 sends a message for commanding access to the terminal management server 20 to the terminal device 100 at stage 307.

When the terminal device 100 receives the message for commanding the terminal device 100 to access the terminal management server 20, the terminal device 100 accesses the terminal management server 20 through the mobile communication network 60 in compliance with the message for commanding the terminal device 100 to access the terminal management server 20 to receive a control command. However, if or when the terminal device 100 fails to receive the message for various reasons at stage 309, the terminal management server 20 is unable to send a control command to the terminal device 100.

For example, if or when a finder of the terminal device 100 removes the SIM thereof such as USIM from the terminal device 100 or replaces the SIM with a new SIM in a situation that the terminal device 200 is lost, subscriber authentication of the terminal device 100 fails. Therefore, since the terminal device 100 is unable to register its location with the mobile communication network 60, the terminal device 100 cannot receive the message at stage 309 (failure to receive). If or when the finder of the terminal device 100 switches off the terminal device 100 the terminal device 100 is also unable to access the mobile communication network 60, and the terminal device 100 cannot receive the message at stage 309.

Information on the aforementioned failure is sent to the terminal management server 20 by the message server 30 at stage 311, and to the access device 10 by the terminal management server 20 at stage 313.

However, in case where the terminal device 100 loads the terminal management program for performing the method for terminal protection in accordance with the preset embodiment even when the message for commanding the terminal device 100 to access the terminal management server 20 is not received, the terminal device 100 can be locked because the terminal managing program is executed when booting the terminal device 100. In case where the terminal device 100 is switched off, the terminal managing program stored in the memory unit 120 is immediately executed if or when the terminal device 100 is booted even once after the switch-off.

In the terminal protection mode at step S201 by executing the aforementioned terminal managing program, the condition checking unit 131 of the controller 130 monitors the operation state of the terminal device 100 at step S203 to determine whether the condition for terminal protection established in advance is satisfied at stage 315. In this case, the condition checking unit 131 checks whether one of exemplary manipulations specified above occurs while the terminal device 100 operates at step S205 to determine whether the terminal protection condition is satisfied. For example, if or when a manipulation, for example, SIM separation, SIM replacement, country code change or firmware update, occurs, it is determined that the condition for terminal protection is satisfied. Since changing the country code implies a roaming environment and illegal use of the terminal device 100 is highly probable, it is determined that the condition for terminal protection is satisfied. In addition, since firmware update implies high probability of illegal use of the terminal device 100, for example, custom firmware update after rooting, it is determined that the condition for terminal protection is satisfied.

Next, when it is determined that the condition for terminal protection is satisfied by the condition checking unit 131, the controller 130 determines that the terminal device 100 is lost at step S207. The communication control unit 133 of the controller 130 monitors the communication channel of the communication unit 110 at step S209 to check whether access to the terminal management server 20 is possible at step S211. If or when the terminal management server 20 is in a state not to be accessed due to no communication channel to be connected to the terminal management server 20, the communication control unit 133 continues to monitor the communication unit 110 until a communication channel is connected.

In this case, the access point 50 provides a wireless communication channel, for example, Wi-Fi or Bluetooth of a wireless communication network to enable the terminal device 100 to be in a wireless connection to the Internet 40. In addition, if or when the terminal device 100 is switched on while its SIM is normally equipped therein, a communication channel is provided by the mobile communication network 60.

As described above, when a communication channel is connected, the communication control unit 133 controls the communication unit 110 to access the terminal management server 20 through the Internet 40 or the mobile communication network 60 at step S213. In this case, the communication control unit 133 controls the communication unit 110 to access the terminal management server 20 using location information stored in the memory unit 120.

In addition, after the terminal device 100 accesses the terminal management server 20, the communication control unit 133 controls the communication unit 110 at step S215 to send unique identification information stored in advance in the memory unit 120 to the terminal management server 20 at stage 317.

Subsequently, the terminal management server 20 compares the identification information of the terminal device 100 requested to be protected at step 303 with the identification information of the terminal device 100 received at stage 317. If or when the identification information matches each other in the comparison, the terminal management server 20 sends a lock command to the terminal device 100 at stage 319, and sends the result to the access device 10 at stage 321.

In the processing process of the terminal management server 20, the terminal identification unit 23 compares the identification information of the terminal device 100 received through the communication unit 21 with unique information stored in the information storage unit 22. If or when the information matches each other in the comparison, the terminal identification unit 23 decides that the terminal device 100 is a terminal device to be protected.

During the above operation, the communication environment checking unit 24 checks the current communication environment situation of the terminal device 100 to be protected depending on the communication channel through which the identification information of the terminal device 100 is received among a plurality of communication channels supported by the communication unit 21. For example, if or when the identification information of the terminal device 100 is received through the mobile communication network 60 at stage 317, the communication environment checking unit 24 confirms that the current communication environment situation of the terminal device 100 identified to be protected allows the mobile communication network 60 to be used and a SMS (Short Message Service) message is received through the mobile communication network 60. In other cases, if or when the identification information of the terminal device 100 is received through the Internet 40 at stage 317, the communication environment checking unit 24 confirms that the current communication environment situation of the terminal device 100 identified to be protected allows access to the Internet 40 through a short-range mobile communication network, such as Wi-Fi or Bluetooth, and reception of push messages or the lile through the Internet 40.

After that, the lock commanding unit 25 sends a terminal lock command to the terminal device 100 through a communication channel allowed in the current communication environment situation of the terminal device 100 identified to be protected among a plurality of communication channels supported by the communication unit 21. For example, if or when the terminal device 100 identified to be protected is allowed to use (or access) the mobile communication network 60, the lock commanding unit 25 sends a terminal lock command as, for example, an SMS message through the mobile communication network 60. However, if or when the terminal device 100 identified to be protected is allowed to use the Internet 40, the lock commanding unit 25 sends a terminal lock command as a push message through the Internet 40.

As described above, when a lock command is issued by the terminal management server 20 at step S217, the lock control unit 135 of the controller 130 locks the terminal device 100 by executing the terminal managing program stored in the memory unit 120 at step S219 and at stage 323. For example, the lock control unit 135 displays a terminal lock screen for locking the screen and functions of the terminal device 100 on the display 150, and restrict sending and/or receiving data and calls and all established functions except emergency calls. In other cases, the lock control unit 135 wipes out personal information stored in the terminal device 100.

As described above, in accordance with at least one embodiment of the present disclosure, the terminal device 100 actively accesses the terminal management server 20 if or when the operation state of the terminal device 100 satisfies the condition for terminal protection to receive a control command even in a state where a message for commanding access to the terminal management server 20 is not received from the terminal management server 20. Therefore, since the terminal management server 20 sends a lock command to the terminal device 100 to lock the terminal device 100, the terminal device 100 is kept from abnormal use and illegal distribution of the terminal device 100.

In addition, the terminal managing program for locking the terminal device 100 is stored in a non-volatile data storage area where the terminal managing program is not reset even when the terminal device 100 is initialized. Therefore, even when the terminal device 100 is factory-reset, the terminal managing program is not deleted and the terminal protection function is still effective. In addition, if or when a finder of the terminal device 100 switches off the terminal device 100, after the terminal device is booted, the terminal device 100 actively attempts access to the terminal management server 20 frequently and lock itself in accordance with the lock command of the terminal management server 20.

In accordance with various embodiments of the present disclosure, even though a terminal device is maliciously manipulated in a state it is lost and messages for commanding access to the terminal management server fail to be received, the terminal device is locked when the condition for terminal protection is satisfied. Therefore, in an unfavorable condition, for example, loss of the terminal device, the terminal device is kept from abnormal use and illegal distribution of the terminal device.

Further, the terminal managing program for locking the terminal device is stored in a non-volatile data storage area where the terminal managing program is not reset even when the terminal device is initialized. Therefore, even though the terminal device is factory-reset, the terminal managing program is not deleted.

In addition, if or when a finder of the terminal device switches off the terminal device, after the terminal device is booted, the terminal device frequently attempts access to the terminal management server to lock itself in accordance with the lock command by the terminal management server.

The terminal device loaded with the terminal managing program for terminal protection in accordance with the embodiment of the present disclosure and non-transitory computer-readable storage medium is used for mobile communication terminal devices such as smart phones or tablet computers and service systems thereof, and wired communication terminal devices to which communication services are provided through a wired network and service systems thereof.

The combinations of the respective blocks of the block diagrams and the respective steps of the flow diagram attached herein are carried out by computer program instructions. Since the computer program instructions are loaded in processors of a general purpose computer, a special purpose computer, or other programmable data processing apparatus, the instructions, carried out by the processor of the computer or other programmable data processing apparatus, create means for performing functions described in the respective blocks of the block diagrams or in the respective steps of the flow diagram. Since the computer program instructions, in order to implement functions in specific manner, are stored in a memory unit useable or readable by a computer or a computer aiming for other programmable data processing apparatus, the instruction stored in the memory unit useable or readable by a computer produces manufacturing items including an instruction means for performing functions described in the respective blocks of the block diagrams and in the respective sequences of the sequence diagram. Since the computer program instructions are loaded in a computer or other programmable data processing apparatus, instructions, a series of sequences of which is executed in a computer or other programmable data processing apparatus to create processes executed by a computer to operate a computer or other programmable data processing apparatus, provide operations for executing functions described in the respective blocks of the block diagrams and the respective sequences of the flow diagram. The computer program instructions are performed by one or more processes or specifically configured hardware (e.g., by one or more application specific integrated circuits or ASIC(s)).

Moreover, the respective blocks or the respective sequences in the appended drawings indicate some of modules, segments, or codes including at least one executable instruction for executing a specific logical function(s). In several alternative embodiments, it is noted that the functions described in the blocks or the sequences run out of order. For example, two consecutive blocks and sequences are substantially executed simultaneously or often in reverse order according to corresponding functions.

The explanation as set forth above is merely described a technical idea of the exemplary embodiments of the present disclosure, and it will be understood by those skilled in the art to which this disclosure belongs that various changes and modifications are made without departing from the scope and spirit of the claimed invention as disclosed in the accompanying claims. Therefore, the exemplary embodiments disclosed herein are not used to limit the technical idea of the present disclosure, but to explain the present disclosure. The scope of the claimed invention is to be determined by not only the following claims but also their equivalents. Specific terms used in this disclosure and drawings are used for illustrative purposes and not to be considered as limitations of the present disclosure. Therefore, the scope of the claimed invention should be construed as defined in the following claims and changes, modifications and equivalents that fall within the technical idea of the present disclosure are intended to be embraced by the scope of the claimed invention.

What is claimed is:

1. A terminal device comprising:
   a communication unit configured to communicate with a terminal management server;
   a memory unit configured to store unique identification information, location information to be used in accessing the terminal management server; and a terminal managing program for locking the terminal device;
   a condition checking unit configured to
      monitor an operation state of the terminal device by executing the terminal managing program, and
      determine whether the terminal device is in a state of a preset condition for terminal protection, the preset condition including subscriber identity module (SIM) separated away from the terminal device;
   a communication control unit configured to, when the condition checking unit determines that the terminal device is in a state of the preset condition for terminal protection,
      control the communication unit to access the terminal management server through an access point in a wireless communication channel other than a mobile communication network, and
      control the communication unit to send, through the access point in the wireless communication channel other than the mobile communication network, the identification information to the terminal management server; and
   a lock control unit configured to lock the terminal device by executing the terminal managing program when a lock command is issued by, and received, through the access point in the wireless communication channel other than the mobile communication network, from, the terminal management server.

2. The terminal device of claim 1, wherein the condition checking unit is configured to determine that the terminal device is in a state of the preset condition for terminal protection when the preset condition occurs while the terminal device is operated.

3. The terminal device of claim 1, wherein the communication control unit is configured to
   monitor a communication channel of the communication unit when the terminal device is determined to be in a state of the preset condition for terminal protection, and
   control the communication unit to be connected to the terminal management server through the communication channel when the communication channel is connected.

4. The terminal device of claim 1, wherein the identification information, the location information and the terminal managing program are stored in a non-volatile data storage area, which is not reset even by initialization, of storage areas of the memory unit.

5. A method of protecting a terminal device comprising one or more processors, the method executed by the one or more processors, the method comprising:

monitoring, by the terminal device, an operation state of the terminal device to determine whether the terminal device is in a state of a preset condition for terminal protection, the preset condition including subscriber identity module (SIM) separated away from the terminal device;

accessing, by the terminal device, a terminal management server through an access point in a wireless communication channel other than a mobile communication network, when the terminal device is in a state of the preset condition for terminal protection;

sending, by the terminal device through the access point in the wireless communication channel other than the mobile communication network, identification information of the terminal device to the accessed terminal management server;

locking, by the terminal device, the terminal device when a lock command is issued by, and received, through the access point in the wireless communication channel other than the mobile communication network, from, the terminal management server.

6. The method of claim 5, wherein in said determining whether the terminal device is in a state of the preset condition for terminal protection, the terminal device is determined to be in a state of the preset condition for terminal protection when the preset condition occurs.

7. The method of claim 5, wherein said accessing the terminal management server comprises:

monitoring a communication channel when the terminal device is in a state of the preset condition for terminal protection; and accessing the terminal management server through the communication channel using the preset location information when the communication channel is connected.

8. The method of claim 5, wherein the identification information, the location information and the terminal managing program are stored in a non-volatile data storage area, which is not reset even when the terminal device is initialized.

9. A non-transitory computer-readable storage medium storing a terminal managing program to perform a method of protecting a terminal device comprising one or more processors, the method performed by the one or more processors, the method comprising:

monitoring, by the terminal device, an operation state of the terminal device to determine whether the terminal device is in a state of a preset condition for terminal protection, the preset condition including subscriber identity module (SIM) separated away from the terminal device;

accessing, by the terminal device, a terminal management server through an access point in a wireless communication channel other than a mobile communication network, when the terminal device is in a state of the preset condition for terminal protection;

sending, by the terminal device through the access point in the wireless communication channel other than the mobile communication network, identification information of the terminal device to the accessed terminal management server; and locking, by the terminal device, the terminal device when a lock command is issued by, and received, through the access point in the wireless communication channel other than the mobile communication network, from, the terminal management server.

10. The non-transitory computer-readable storage medium of claim 9, wherein in said determining whether the terminal device is in a state of the preset condition for terminal protection, the terminal device is determined to be in a state of the preset condition for terminal protection when the preset condition for the terminal device occurs.

11. The non-transitory computer-readable storage medium of claim 9, wherein said accessing the terminal management server comprises:

monitoring a communication channel when the terminal device is in a state of the preset condition for terminal protection; and accessing the terminal management server through the communication channel using preset location information when the communication channel is connected.

12. The non-transitory computer-readable storage medium of claim 9, wherein the identification information, the location information and the terminal managing program are stored in a non-volatile data storage area which is not reset even when the terminal device is initialized.

* * * * *